R. KROEDEL.
FOLDING CAMERA.
APPLICATION FILED DEC. 19, 1921.

1,435,646.

Patented Nov. 14, 1922.
2 SHEETS—SHEET 1.

INVENTOR.
Robert Kroedel
BY Frederick H. Church
his ATTORNEY

R. KROEDEL.
FOLDING CAMERA.
APPLICATION FILED DEC. 19, 1921.
1,435,646.
Patented Nov. 14, 1922.
2 SHEETS—SHEET 2.
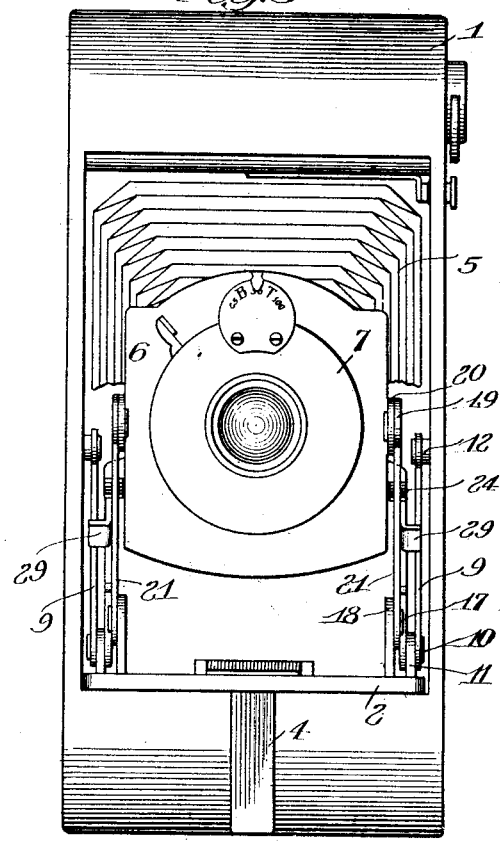
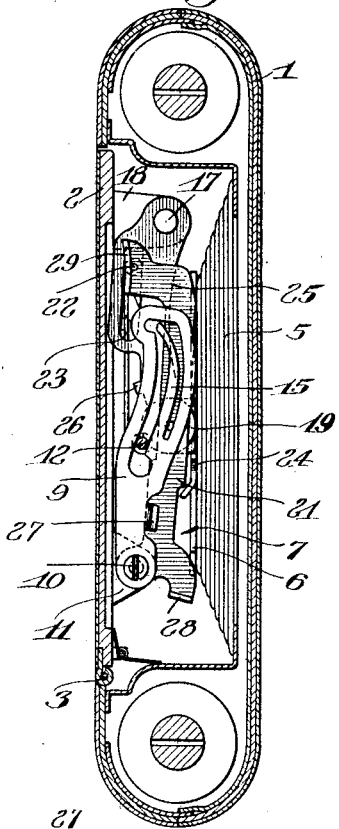
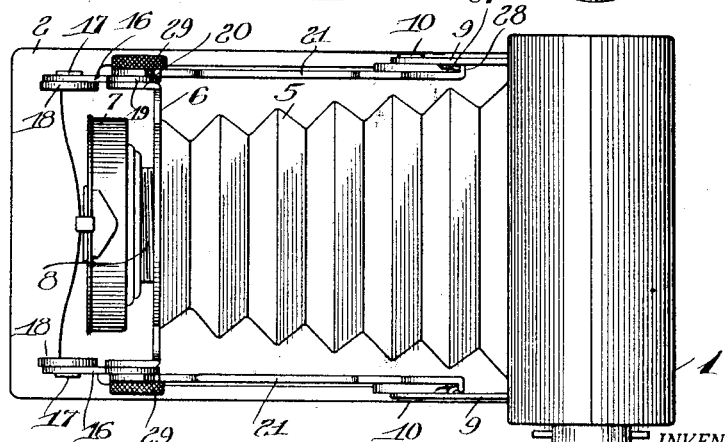
INVENTOR.
Robert Kroedel
BY Frederick F. Church
his ATTORNEY Patented Nov. 14, 1922.

1,435,646

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

Application filed December 19, 1921. Serial No. 523,302.

*To all whom it may concern:*

Be it known that I, ROBERT KROEDEL, a citizen of the United States, residing at Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference numerals marked thereon.

My present invention relates to photography and, more particularly, to hand cameras of the folding type in which a door on the camera is opened to provide a bed, and a bellows front and lens mount are projected into focusing position on the bed, and my invention has for its object to provide a simple, convenient and serviceable projecting mechanism whereby the front carrying the lens is automatically projected to an erect focusing position and rigidly held there. To these and other ends the invention consists in certain improvements and combinations of parts, all as will be hereinafter more fully described, the novel features being pointed out in the claims at the end of the specification.

In the drawings:

Figure 3 is a front view of the camera in the position of Figure 1;

Figure 4 is a central sectional view through the camera when completely folded, and Figure 5 is a top view with the camera in the position of Figure 1.

Similar reference numerals throughout the several views indicate the same parts.

Figure 1:
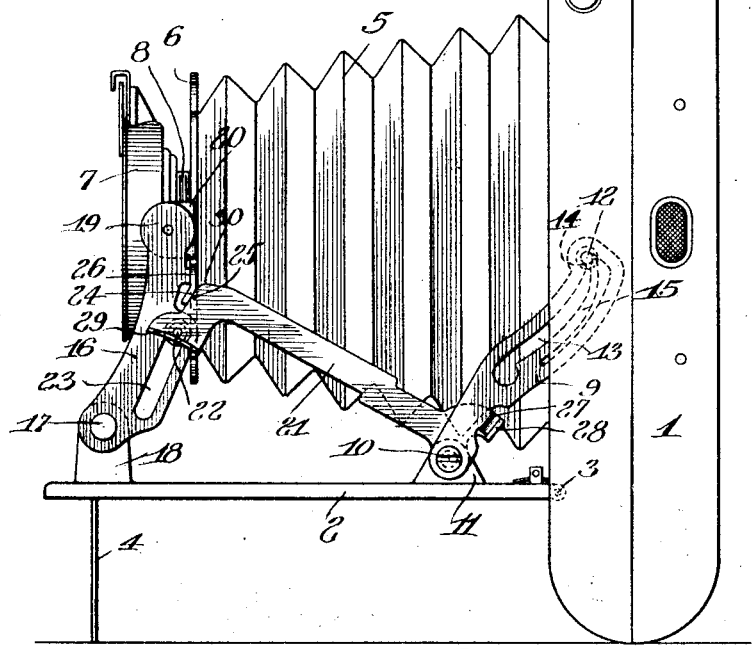
Figure 1 is a side elevation of a folding camera constructed in accordance with and illustrating one embodiment of my invention, the parts being extended ready for use.

The general type of folding camera shown in the drawings is well known in the art, the major parts consisting of a body 1 having a door 2 at the front thereof hinged at 3 and furnishing when extended as in Figures 1, 3 and 5, a bed that may be supported at its outer end by a leg 4. When so extended there is projected from within the body a bellows 5 connected at its forward end to a lens board 6 carrying the shutter casing 7 with lens tube 8 and contained lens. When the bed 2 is closed against the body the described parts collapse within the latter.

My invention as above stated relates more particularly to mechanism that I will now describe for erecting and folding these parts automatically with the movement of the bed 2, and I will describe this mechanism first in its extended position, as shown for instance in Figure 1, as the parts there appear more clearly and their relationship is more readily understood. The bed 2 is locked, braced and supported rigidly in its extended position by a brace 9 at each side, one end of which brace is, in the present instance, pivoted at 10 to an upwardly extending ear 11 on the bed. The other end engages a headed pin 12 on the inside wall of the cavity of the body that houses the parts. For this purpose the brace is slotted at 13 to ride on the pin 12 and at the end of the slot is a lateral recess providing a shoulder 14 against which the pin may lock to rigidly hold the bed in its said position. It is guided into this recess and against the shoulder 14 when moving from the folded position of Figure 4 by a spring tongue 15 located within the slot 13 and formed integrally with the material of the brace, its action being evident from Figure 1 where the curved end of the tongue is shown holding the pin and shoulder in engagement.

The lens mount 6 on the camera front is pivotally and swingingly mounted upon a supporting link 16, one of which is provided at each side. The lower end of the link is pivoted at 17 to an ear 18 rising from the camera bed while the upper end is pivoted at 19 to a forwardly turned ear 20 on a lateral edge of the lens mount 6, such ear and pivotal point being preferably centrally arranged with respect to the vertical. Each supporting link 16 is itself held in a position to hold the lens mount erect by a folding brace 21, of which there is one also on each side of the camera and bed. The rear end of this brace turns on the pivot 10 being carried by the ear 11 along with the brace 9 while the forward end is provided with a headed pin or roller 22 travelling in a longitudinal slot 23 in the link 16. The roller occupies a position at the extreme upper end of this slot when the parts are extended and in bracing positions as shown in Figure 1.

The brace 21 is also utilized to lock the lens mount 6 against movement on its pivot 19 relatively to its supporting link 16 in addition to holding the latter properly elevated, and for this purpose the lens mount or board 6 is provided at each side with a lateral guiding and locking member 24 in the present form of a lug of the shape shown. When the parts are projected in the manner hereinafter described, this member 24 is confined between an abutting face formed by an elbow portion 25 on the link 21 and an abutting face 26 formed by a short rearward extension on the rear edge of the link 16 as clearly shown in Figure 1.

When the brace 9 is in the locked position of Figure 1 in engagement with the pin 12 and is so held by the spring tongue 15, its tendency under the tension of the latter is to move downwardly and rearwardly on its pivot 10 which tendency brings an ear 27 on the said brace into engagement with an offset shoulder 28 on the brace 21 beyond the pivot 10 and above it so that the brace 9 in the said position holds the brace 21 in its raised or operative position.

Figure 2:
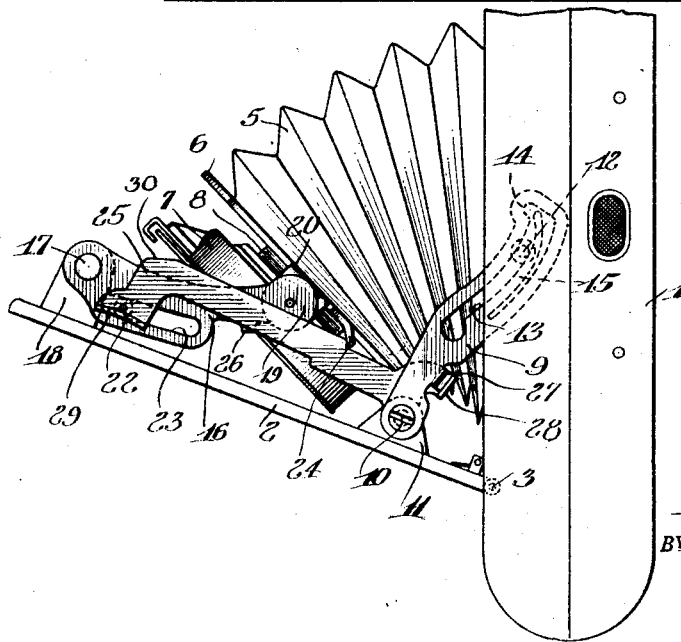
Figure 2 is a side view of the same camera with the upper portion of the body broken away and partially folded to show the collapsed positions of the parts.

The forward or raised end of the front brace 21 at the end of the elbow portion 25 and in the region of the pin or roller 22 is turned laterally to form an offset finger portion 29. When it is desired to fold and close the camera the operator merely presses downwardly on these finger portions 29 with his two thumbs which swings the braces 21 downwardly into substantial parallelism with the bed 2, as shown in Figure 2. This movement, through the shoulder 28 on said brace acting against the ear 27 on the brace 9 moves the latter upwardly and forwardly against the tension of the spring 15 and releases the brace 9 from the fixed pin 12 on the body allowing the brace 9 to fold, as also shown in Figure 2. At the same time the movement of the pin 22 in the slots 23 of the links 16 swings the latter downwardly and rearwardly toward the bed 2 and releases the members 24 of the lens mount 6 from their clamped positions. They travel down the upper edges of the braces 21 in the manner shown in Figure 2, and the lens mount folds against the bed, the parts finally reaching the positions of Figure 4 when the camera is completely folded. Upon opening the camera by extending the bed 2 it will be understood without repeating these detailed movements that the actions of the parts are reversed and the positions of Figure 1 automatically resumed. The brace 9 being drawn down by the outward movement of the bed 2 communicates motion to the brace 21 instead of receiving it and raises the brace 21 which in turn raises the front lens 16. The lens mount or board 6 meantime travels on the braces 21 to a position adjacent to the links 16 at which point and with the final movement of the brace 21 a cam surface 30 on the elbow portion 25 engages the guiding and locking member 24 on the lens mount and directs it into its proper locking position between the brace and lens as first described.

I claim as my invention:

1. In a folding camera, the combination with a body, a bed hinged thereto, a folding lens mount and folding means on the bed pivotally and swingingly supporting the lens mount and provided with guides, of a folding brace for the lens mount pivoted to the bed and slidably cooperating with the guides of the lens mount support.

2. In a folding camera, the combination with a body, a bed hinged thereto, a folding lens mount and folding means on the bed pivotally and swingingly supporting the lens mount and provided with guides, of a folding brace for the lens mount pivoted to the bed and slidably cooperating with the guides of the lens mount support, said brace being provided adjacent to the guides with finger piece extensions for folding the aforesaid pivoted elements down against the bed through the downward movement of the brace.

3. In a folding camera, the combination with a body, a bed hinged thereto, a folding lens mount and folding means on the bed pivotally and swingingly supporting the lens mount and provided with guides, of a folding brace for the lens mount pivoted to the bed and slidably cooperating with the guides of the lens mount support, said lens mount being provided with a member adapted to travel on the brace and guide the lens mount between its erect and collapsed positions.

4. In a folding camera, the combination with a body, a bed hinged thereto, a folding lens mount and folding means on the bed pivotally and swingingly supporting the lens mount and provided with guides, of a folding brace for the lens mount pivoted to the bed and slidably cooperating with the guides of the lens mount support, said brace also being adapted to engage and lock the lens mount on its pivot in an upright position when the parts are erected.

5. In a folding camera, the combination with a body, a bed hinged thereto, a folding lens mount provided with a guiding and locking member and folding means on the bed pivotally and swingingly supporting the lens mount and provided with guides, of a folding brace for the lens mount pivoted to the bed and slidably cooperating with the guides of the lens mount supports, said brace being provided with a cam adapted to engage the guiding and locking member on the lens mount and confine it against the supporting means when the parts are erected.

6. In a folding camera, the combination with a body, a bed hinged thereto, a folding lens mount and folding means on the bed pivotally and swingingly supporting the lens mount and provided with guides, of a folding brace for the lens mount pivoted to the bed and slidably cooperating with the guides of the lens mount support, a second brace between the bed and body pivoted to one such member and slidably engaging the other, a spring latch for locking the second brace in extended position and a connection between the braces adapting the second to be released by pressure upon the first.

7. In a folding camera, the combination with a body and a bed hinged thereto, of a folding brace pivoted to one of said parts and slidably engaging the other, the brace being provided with a slot terminating in a shoulder and with an integral spring tongue located in the slot and the engaged member being provided with a pin against which the shoulder is automatically locked by engagement of the pin with the spring tongue.

ROBERT KROEDEL.